Dec. 20, 1960 R. T. LORENZEN 2,965,295
MECHANICAL EGG COUNTER
Filed April 30, 1956 3 Sheets-Sheet 1

INVENTOR.
ROBERT T. LORENZEN
BY
ATTORNEY

Dec. 20, 1960  R. T. LORENZEN  2,965,295
MECHANICAL EGG COUNTER
Filed April 30, 1956  3 Sheets-Sheet 2
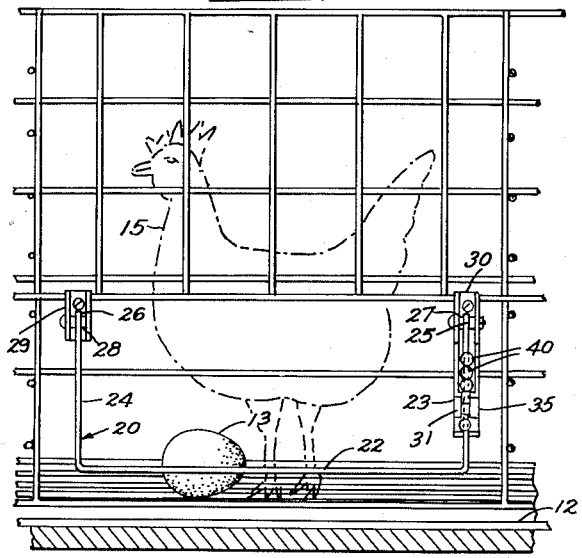
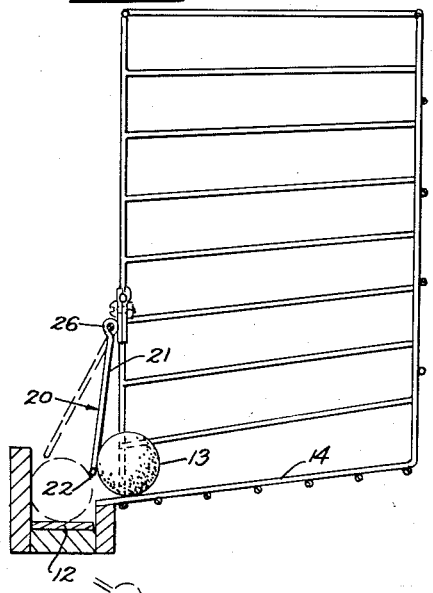
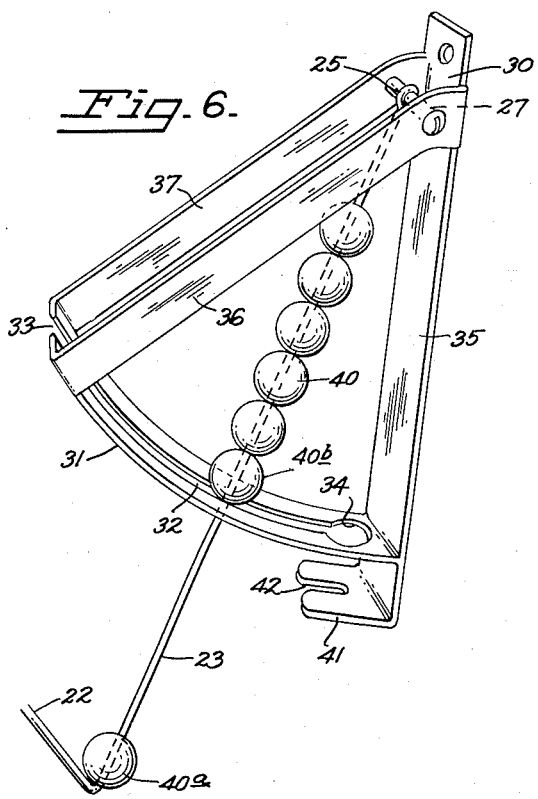
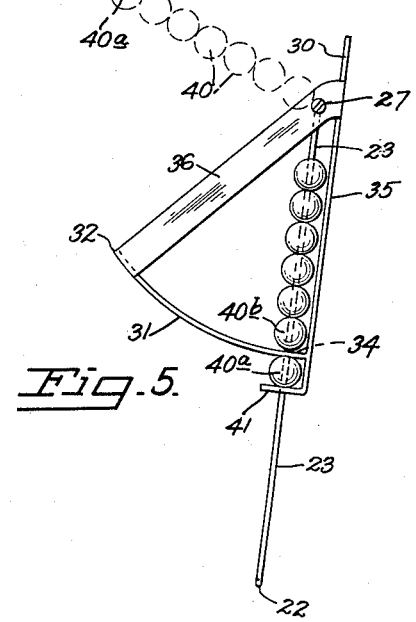
INVENTOR.
ROBERT T. LORENZEN
BY
ATTORNEY Dec. 20, 1960  R. T. LORENZEN  2,965,295
MECHANICAL EGG COUNTER Filed April 30, 1956  3 Sheets-Sheet 3

INVENTOR.
ROBERT T. LORENZEN
BY
ATTORNEY

United States Patent Office 2,965,295
Patented Dec. 20, 1960

2,965,295

MECHANICAL EGG COUNTER

Robert T. Lorenzen, Davis, Calif., assignor to The Regents of the University of California, Berkeley, Calif.

Filed Apr. 30, 1956, Ser. No. 581,477

4 Claims. (Cl. 235—98)

This invention relates to a device for recording the egg production of individual hens. More particularly, it relates to a mechanical egg counter for individual laying cages.

In the laying battery the counting and recording of how many eggs are produced by an individual hen facilitates culling the flock and aids in selective breeding for improved production. In the past, when eggs were gathered manually from a battery of individual laying cages, they were credited to each hen by notation on a card. With the introduction of conveyor belts for gathering eggs, this recording system became impractical, and poultrymen had no satisfactory way of recording egg production.

In some experimental work, records of egg production have been made electrically, the individual eggs being counted by an electrical signal as each one rolled from its cage onto the conveyor belt, the signals being tabulated on a central panel. However, for all but the largest egg producers the expenses involved in such an elaborate egg-recording system could not be justified. What is needed is a simple, low-cost mechanical egg counter for individual laying cages.

Accordingly, one object of the invention is to aid in mechanization of the egg-producing industry by providing an egg counter which records each egg as it rolls from an individual laying cage onto egg-gathering conveyor belts.

Another object of the invention is to provide a simple means of crediting each hen of a battery of laying cages with its egg production.

Another object of the invention is to provide an egg-counting device that is inexpensive to manufacture and to maintain.

Another object of the invention is to provide a foolproof mechanical egg counter.

Another object is to provide an easily maintained egg-counting system for crediting individual hens with their production.

A further object is to provide an egg production line wherein eggs are conveyed away from the laying cages after they have been laid, but are individually counted for and credited to each hen.

The present invention accomplishes these objects, and solves the egg-counting problem, by providing a swinging trip wire that is tripped each time an egg passes from a laying cage to the conveyor belt. Each time the wire is tripped, one only of a series of beads around a generally vertical portion of the trip wire falls from an uncounted position near an upper end of the wire toward the lower end of the wire, where it indicates the laying of one egg. The structure is inexpensive, positive, and fool-proof.

Other objects, features, and advantages of the invention will appear from the following description of several preferred embodiments presented in accordance with 35 U.S.C. 112.

In the drawings:

Fig. 3 is a view in front elevation of an individual laying cage having an egg counter embodying the present invention, with an egg about to swing the trip wire.

Fig. 4 is a view in side elevation of a portion of Fig. 3, showing by dotted and solid-line portions the actuation of a trip wire by an egg.

Fig. 5 is a view in side elevation, showing in solid lines the egg counter of Fig. 3 in its cocked position, and showing in dot-dash lines the resetting of the beads thereon.

Fig. 6 is a view in perspective, showing the egg counter of Fig. 5 in its tripped position, with a counting bead fallen to its recording position.

Figures 1, 2:
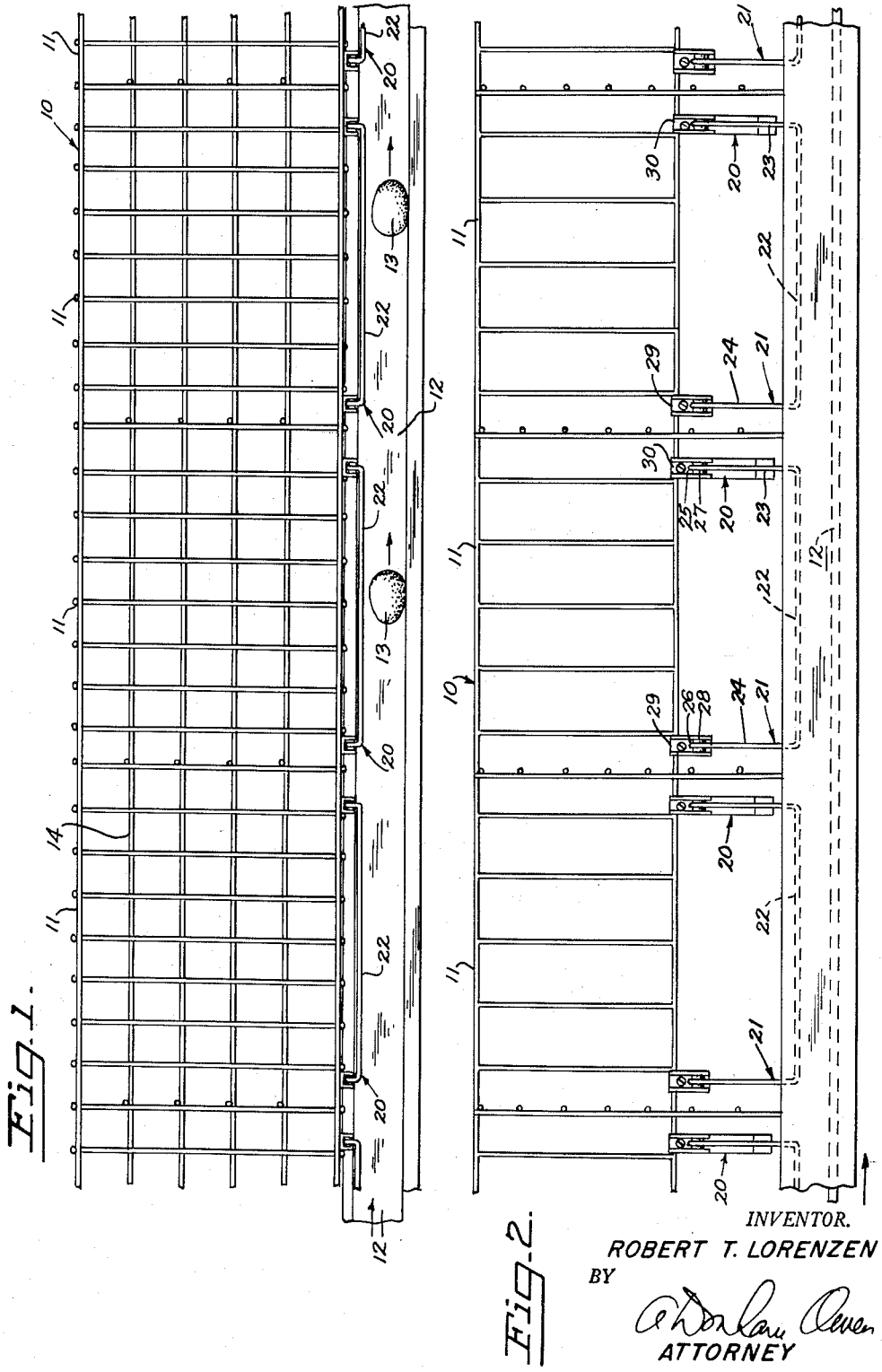
Fig. 1 is a top plan view of a series of laying cages in a conveyor-belt system of egg production employing the principles of the present invention.
Fig. 2 is a view in front elevation of the layout of Fig. 1.

Figs. 1 and 2 show a battery 10 of individual laying cages 11, each of which houses a hen. The cages 11 are arranged in a series above and at one side of a conveyor belt 12. When an egg 13 is laid, it drops a short distance onto an inclined wire floor 14, rolls down onto the conveyor belt 12, and is carried away. As Figs. 3 and 4 indicate, the belt 12 may be a narrow belt. It may be run intermittently for a short interval for collection of all the eggs produced by the battery 10.

The present invention solves the problem of maintaining a system using conveyor belt operation while still counting each egg and crediting it to the proper hen. It does this by providing a mechanical egg counter 20 for each cage 11, or, in other words, for each hen 15. Each egg counter 20 comprises a trip wire 21, preferably arranged in a U shape by bending a single piece of wire to provide a horizontal trip portion 22 between two generally vertical legs 23, 24, whose upper ends 25, 26 are pivotally mounted for free swinging action. In the form of the invention shown in Figs. 3–6 the ends 25, 26 are hooked around pivots 27, 28, which are supported by brackets 30, 29. In any event, wires 21 are so arranged that the horizontal trip wire 22 is lifted and the vertical wires 23, 24 are swung out by each egg 13 that rolls down from the wire table 14 to the conveyor belt 12, after which the wire swings back in of its own weight.

The trip wire 21 is employed to actuate a bead-counting mechanism so that each time the wire 21 is tripped, one and only one bead falls from the upper part of the wire 23 to the lower part, as where it intersects the horizontal wire 22. Several different embodiments of the counting mechanism are shown.

In the form shown in Figs. 3 through 6, the bracket 30 supports an arcuate bead rest 31, whose radial center lies at the pivot 27. The bead rest 31 is provided with a central slot 32 to accommodate the wire 23 with adequate clearance. The slot 32 is open at its outer end 33 and has a bead port 34 at its inner end where it abuts a rear frame member 35. The outer end of the arcuate bead rest 31 may be supported by a pair of stabilizer frame members 36, 37.

As shown in Fig. 6, when the trip wire 21 swings, the arcuate member 31 supports a series of beads 40 above it, but when the wire 21 has been tripped by an egg 13 passing under it, and the wire swings back to its cocked position, shown in solid lines in Fig. 5, the lowermost bead 40a of those supported by the bead rest 31 falls through the bead port 34 and is caught just below it by a cocking lug 41. This lug 41 is spaced below the bead port 34 an amount approximately equal to the height of a bead 40, so that only one bead 40 can fall through each time. It is slotted at 42 to receive the wire 23 while supporting the bead 40a. When the next egg trips the wire 21, it will swing the wire 23 and the bead rest 31 will support all the beads 40 except the bead 40a that had fallen below it and rested on the cocking lug 41. That bead 40a will drop along the wire 23 to the lower end thereof, and on the return swing another bead 40b will drop through the port 34 onto the lug 41.

Any desired number of beads 40 may be provided on the wire 23; seven have been shown, the number normally used when a weekly tabulation is made. At that time someone checks the cages 11 and records the individual data. The period may be longer, in which case there should be more beads, though a weekly cage inspection is generally in the interest of good flock management. During the inspection, each counter 20 may be reset by lifting the trip wire 21 until the wire segment 23 is lifted beyond the open end 33 of the slot 32 and the beads fall toward the end 25 of the wire 23 (see dotted-line portion of Fig. 5). The wire 21 may then be lowered, holding the lowermost bead 40a in place until it once again is supported by the arcuate bead rest 31.

Figure 7:
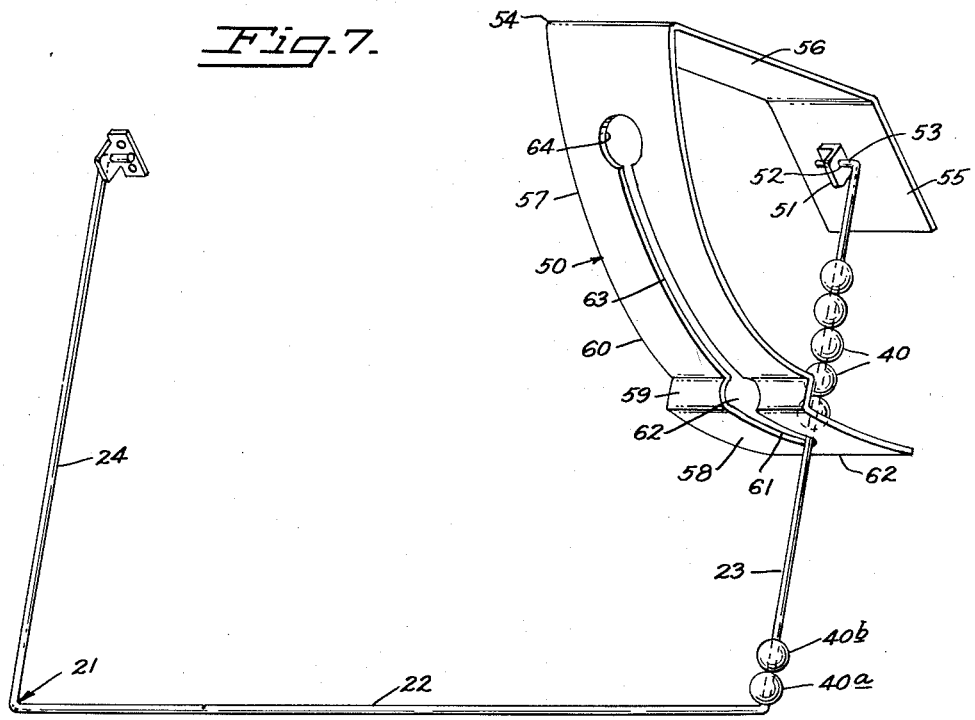
Fig. 7 is a view in perspective of a modified form of counter, also embodying the principles of the invention.

The counter 50 shown in Fig. 7 is a modified form of the invention. The trip wire 21 is substantially the same, but instead of having its ends 25, 26 looped and mounted around a pivot 27, 28, the pivot is provided by a pair of simple L-brackets 51, each with a hole 52 through which a bent-out end 53 of the wire 21 is inserted. The support for the bracket 51 is provided by a unitary frame member 54 bent to shape to provide a supporting bracket portion 55, a top portion 56, and two arcuate portions 57, 58, with a generally radial offsetting portion 59 between them, these three portions 57, 58 and 59 comprising a bead rest 60. The offset portion is the height of one bead 40. A slot 61 extends from substantially the inner end 62 of the bead rest 60, where it is not enlarged, to a bead counting port 62 in the offset portion 59, and a slot 63 extends from there to a reset port 64 near the upper end of the radially inner arcuate portion 57.

In this form of the invention one bead 40a falls out through the port 62 each time the wire 21 is swung out, the bead 40a immediately falling to counting position. It does not matter that the other beads 40 are swung beyond the port 62, since only one bead at a time can drop out and it can drop out only when the wire 23 is moving away from the cage 11. On the return swing the beads 40 fall down the height of one bead at the step 59 and are carried by the lower, larger-radius arcuate portion 58. The beads 40 are reset by lifting the wire 23 and sliding them through the port 64. This modification results in a somewhat less expensive structure than that shown in Figs. 3–6.

Figure 8:
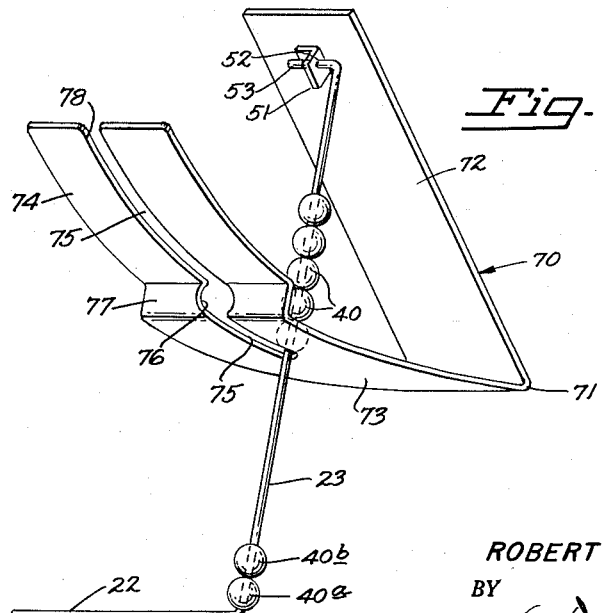
Fig. 8 is a view in perspective of another modified form of egg counter.

Still another modified form 70 of the invention is shown in Fig. 8. Here the trip wire 21 is mounted as in Fig. 5. A unitary frame 71 provides a rear portion 72 and a bead rest 73 with two offset arcuate portions 74, 75 with an open-end slot 75 and with a bead port 76 in a radial offset portion 77. The frame 70 is still simpler than the frame 50. The open upper end 78 of the slot 75 provides for resetting of the beads 40. The step at 77 is again the height of one bead 40. Operation is substantially the same as that of the device 50.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. An egg counter comprising a trip wire having a generally horizontal portion and a pivotally suspended generally vertical portion for swinging movement over a cycle in response to an egg being rolled against and under said horizontal portion; a plurality of beads slidably mounted on said vertical portion; and a stationary arcuate bead rest adapted to support a column of beads thereabove, said bead rest having a slot through which said vertical wire portion extends and along which it moves when swinging, said slot being enlarged at one portion to provide a port therethrough through which one and only one bead can fall each swinging cycle, to count the number of cycles said trip wire swings, thereby indicating the number of eggs that caused that swinging.

2. An egg counter comprising a trip wire having a generally horizontal portion and a pivotally suspended generally vertical portion for swinging movement over a cycle in response to an egg being rolled against and under said horizontal portion; a plurality of beads slidably mounted on said vertical portion; and a slotted arcuate bead rest adapted to support a column of beads thereabove, said bead rest comprising a single arcuate member having its slot open at its upper end with the bead port at its lower end and a cocking lug spaced below said port a distance equal to the diameter of one bead, said bead rest having a port therethrough through which one and only one bead can fall, each swinging cycle, to count the number of cycles said trip wire swings, thereby indicating the number of eggs that caused that swinging.

3. An egg counter comprising a trip wire having a generally horizontal portion and a pivotally suspended generally vertical portion for swinging movement over a cycle in response to an egg being rolled against and under said horizontal portion; a plurality of beads slidably mounted on said vertical portion and a slotted arcuate bead rest adapted to support a column of beads thereabove, said bead rest comprising two arcuate portions, an inner portion of larger radius and an outer portion of smaller radius, connected by a radial portion substantially the length of the diameter of one bead, said bead rest having its slot closed at both ends and provided with a reset port at its upper end and a counting port therethrough at said radial portion through which one and only one bead can fall, each swinging cycle, to count the number of cycles said trip wire swings, thereby indicating the number of eggs that caused that swinging.

4. An egg counter comprising a trip wire having a generally horizontal portion and a pivotally suspended generally vertical portion for swinging movement over a cycle in response to an egg being rolled against and under said horizontal portion; a plurality of beads slidably mounted on said vertical portion; and a slotted arcuate bead rest adapted to support a column of beads thereabove, said bead rest comprising two arcuate portions of different radius, the one of smaller radius lying lower than the other one, connected by a radial portion one bead long and containing a bead port therethrough as an enlargement of the slot, through which one and only one bead can fall each swinging cycle, to count the number of cycles said trip wire swings, thereby indicating the number of eggs that caused that swinging, said slot being open at its upper end.

References Cited in the file of this patent

UNITED STATES PATENTS

| | | |
|---|---|---|
| 521,678 | Smyth | June 19, 1894 |
| 1,359,484 | Burne | Nov. 23, 1920 |
| 1,435,353 | Wanders | Nov. 14, 1922 |
| 2,234,208 | Thompson et al. | Mar. 11, 1941 |
| 2,305,708 | Jacobsen | Dec. 12, 1942 |
| 2,516,443 | Wylde | July 25, 1950 |
| 2,540,751 | Mumma | Feb. 6, 1951 |
| 2,696,349 | Bumstark | Dec. 7, 1954 |